Patented Apr. 24, 1928.

1,667,238

UNITED STATES PATENT OFFICE.

ARTHUR BINZ, OF BERLIN, AND CURT RÄTH, OF RANGSDORF, GERMANY.

METHOD FOR THE REDUCTION OF ARSONIC ACIDS.

No Drawing. Application filed July 13, 1926, Serial No. 122,267, and in Germany July 22, 1925.

The purpose of this invention is an improvement in the method of reducing arsonic acids which may contain a substituent such as for instance the hydroxyl, carboxyl group or the like. This invention is applicable to arsenic compounds of various kinds for instance to isocyclic or heterocyclic or aliphatic arsenic compounds. It allows also the production of unsymmetrical arseno compounds.

We have found that if compounds of this type, being unsubstituted or substituted by hydroxyl or carboxyl radical or radicals are treated with the common alkaline reducing agents, used for the reduction of arsonic acids, a product results which very frequently varies as far as their solubilities are concerned. Sometimes they are even absolutely or incompletely insoluble in alkaline solutions. For example if 2-hydroxy-5-pyridine arsonic acid is reduced by means of an alkaline hydrosulphite or hypophosphoric acid an arseno compound is obtained which is insoluble in alkaline solutions. The faculty of the hydroxy group or the carboxy group of making a compound soluble in alkali has therefore been lost. We do not know the cause of this difficulty but believe it to be due to the formation of some anhydride form of compound.

We have now found that soluble reduction products can be obtained from such substituted arsenic compounds if addition products of sulphoxylic acid, chiefly carbonyl sulphoxylic acid such as for instance formaldehyde sulphoxylic acid, acetone sulphoxylic acid and the like are used as reducing agents. Thus, we first treat an aqueous sodium carbonate solution or suspension of the hydroxyl-containing arsonic acid with, for instance, formaldehyde-sulphoxylate and then acidify with hydrochloric acid. A heavy yellow precipitate of the reduction product is immediately formed.

The arsenic reduction product thus formed is readily soluble in alkaline solutions. Similar results are obtained on reduction with diformaldehydesulphoxylic acid, acetone sulphoxylic acid and the like.

We have, furthermore, found that it is not necessary that the whole quantity of the carbonyl sulphoxylic acid should be present in the form of free acid. It is sufficient when a part of the reducing agent is present in the state of the free acid, whilst the rest may be present in the form of its salt. In some cases the acidity of the arsonic acids will be sufficient for liberating the free sulphoxylic acid required from its salt.

When carrying out the process in accordance with our invention we found it useful to work at temperatures below 50° C., room temperature being particularly advantageous.

It is of course known that aromatic arseno compounds containing an amino group are rendered soluble by treatment with sulphoxylates but here there is the well known amine sulphoxylate condensation taking place. In our case the resulting products contain no sulphur.

Example 1.

20 grams of 2-hydroxy-5-pyridine arsonic acid is dissolved in 200 cc. water containing 4.6 grams sodium carbonate. A solution of 60 grams of formaldehyde sulphoxylate in 300 cc. water and 86 cc. normal hydrochloric acid are now added. This mixture is warmed for four hours at 40–50° C. In this time a yellow bright precipitate is formed which is readily soluble in an alkaline solution.

Example 2.

2.4 grams 2-hydroxy-3-bromo-pyridyl-5-arsonic acid and 1.8 grams 2-hydroxy-pyridyl-5-arsonic acid are dissolved in 100 cc. water by heating. To the solution which has been cooled to 20° C., are added 20 grams pulverized formaldehyde sulphoxylate. The mixture is agitated in the cold for 48 hours. The precipitate formed is filtered off, washed with water, alcohol and ether and dried in vacuo. Light yellow substance, which is insoluble in water, soda carbonate solution and diluted acids, readily soluble in dilute caustic soda. The formula of the substance is

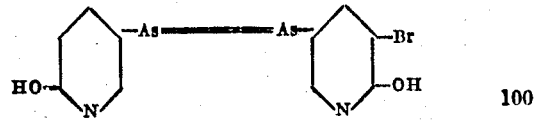

Example 3.

13 grams sodium hydrosulphite are dissolved in 100 cc. water containing 4 grams sodium hydroxide. To this solution are added 10 cc. acetone, whereby a solution of sodium acetone sulphoxylate is obtained. 10 minutes later 4 grams 2-hydroxy-5-pyridine arsonic acid are added. The solution becomes faintly yellow, a precipitation is not observed. On acidifying with hydrochloric acid a light yellow precipitate settles down, which after being washed with water is soluble in dilute caustic soda solution. Carbonic acid precipitates from the alkaline solution the 2-6-dihydroxy-3-5-arsenopyridine which is soluble in dilute caustic soda solution.

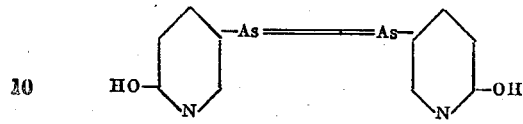

What we claim is:

1. Method for the reduction of arsonic acids not condensing with addition products of sulphoxylic acid which comprises treating said acids with addition products of sulphoxylic acid.

2. Method for the reduction of hydroxylated arsonic acids not condensing with addition products of sulphoxylic acid, which comprises treating said acids with carbonyl sulphoxylic acid.

3. Method for the reduction of arsonic acids not condensing with addition products of sulphoxylic acid which comprises treating said acids with formaldehyde-sulphoxylic acid.

4. Method for the reduction of hydroxylated arsonic acids not condensing with addition products of sulphoxylic acid which comprises treating an alkaline aqueous solution of said acids with carbonyl sulphoxylate and subsequently acidifying the same.

Signed at Berlin, Brandenburg, Prussia, this 22nd day of June A. D. 1926.

ARTHUR BINZ.
CURT RÄTH.